No. 715,694. Patented Dec. 9, 1902.
W. S. RICHARDS.
RAKE.
(Application filed June 9, 1902.)
(No Model.)
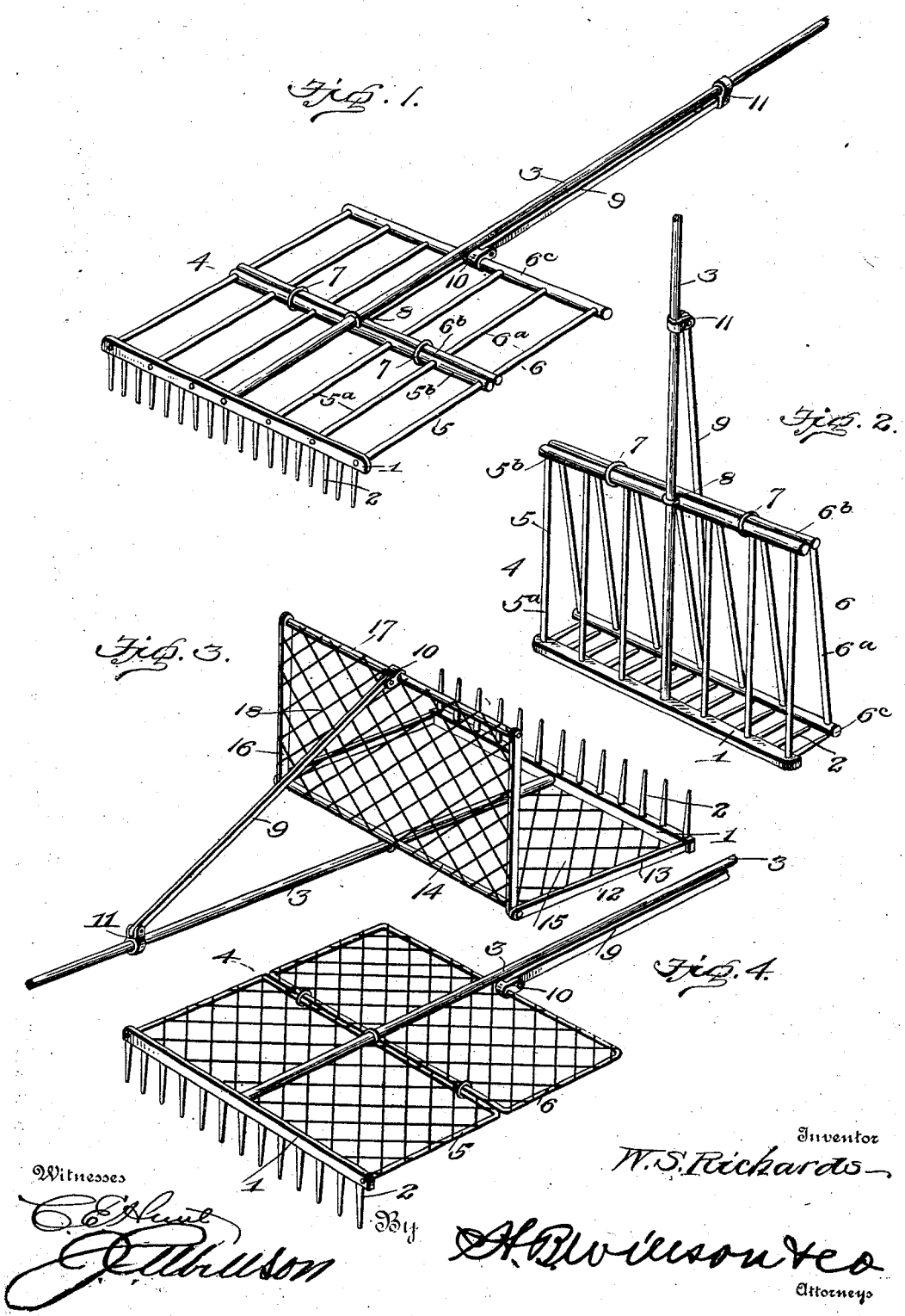

UNITED STATES PATENT OFFICE.

WILLIAM S. RICHARDS, OF ALBANY, OREGON.

RAKE.

SPECIFICATION forming part of Letters Patent No. 715,694, dated December 9, 1902.

Application filed June 9, 1902. Serial No. 110,906. (No model.)

*To all whom it may concern:*

Be it known that I, WILLIAM S. RICHARDS, a citizen of the United States, residing at Albany, in the county of Linn and State of Oregon, have invented certain new and useful Improvements in Rakes; and I do declare the following to be a full, clear, and exact description of the invention, such as will enable others skilled in the art to which it appertains to make and use the same.

The invention relates to rakes.

The object of the invention is to provide a rake which shall be simple of construction, durable in use, comparatively inexpensive of production, and efficient in action, and in which, after a certain amount of grass, brush, weeds, and the like have accumulated in the rake-teeth, provision is made for holding the material in position so as to enable the rake to be lifted from the ground and be carried to a point where it is desired to discharge the material.

With this and other objects in view the invention consists of certain novel features of construction, combination, and arrangement of parts which will be hereinafter more fully described, and particularly pointed out in the appended claim.

In the accompanying drawings, Figure 1 is a perspective view of the rake, illustrating one form of my invention, the hinged member of the holder being in the position it assumes with respect to the rake when the rake is in action. Fig. 2 is a similar view, the hinged section of the holder being in the position it assumes when it is desired to lift the rake with its load and prevent the load from falling off the rake and scattering along upon the ground as it is being carried to the place of discharge. Fig. 3 is a similar view of a modified form of the invention, and Fig. 4 is a similar view of still another modified form of the invention.

Referring to the drawings, 1 denotes the rake-head, having the usual teeth 2 and a handle 3. 4 denotes the grass or brush holder, which consists of a fixed frame 5 and a hinged frame 6, each of which is preferably of open-work construction. The frame 5 consists of longitudinal rods 5ª, connected at their forward ends to the rake-head and at their rear ends to a cross-piece 5ᵇ, while the hinged frame consists of longitudinal rods 6ª and cross-pieces 6ᵇ and 6ᶜ, to which the ends of the rods are connected, the cross-piece 6ᵇ being connected to the cross-piece 5ᵇ by rings 7 or other fastenings, whereby the section 6 has a hinged connection with the section 5. In order to strengthen the construction, the cross-piece 5ᵇ may be connected to the handle in any suitable manner—as, for instance, by a staple 8. 9 denotes an operating-bar, one end of which is pivotally connected to the cross-piece 6ᶜ and the other end of which has a sliding connection with the handle. The connection of the bar to the hinged section and to the handle is preferably effected by the heads 10 and 11, the former of which is loosely mounted upon the bar 6ᶜ and is pivoted to the bar 9, and the latter of which is slidably mounted upon the handle 3 and is pivoted to the other end of the bar 9.

In action, when the parts are in the position shown in Fig. 1 the rake may be used as an ordinary rake. After a certain amount of material has been raked up and it is desired to carry this material to some point and discharge it from the rake the hinged section of the holder is swung to the position shown in Fig. 2, in which position the material may be carried to the point where it is desired to discharge it, and by moving the hinged section to the position shown in Fig. 3 the material may be readily discharged therefrom.

In the construction shown in Fig. 3 I have shown the holder composed of a rigid frame 12, consisting of the side pieces 13, the end piece 14, and a wire-netting 15. The hinged member of the holder is composed of the side pieces 16, cross-piece 17, and wire-netting 18. The inner ends of the side pieces 16 are pivoted to the cross-piece 14.

In Fig. 4 the construction is practically the same as that shown in Figs. 1 and 2, with the exception that where I employ the rods 5 and 6 in Figs. 1 and 2 I employ a wire-netting in lieu thereof and make the frame of metal bent into form.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with a rake, of a holder consisting of a frame extending from the rake-head rearwardly, a second frame hinged to the first frame, and a rod having one end pivoted to the hinged frame and the other end slidably connected with the handle of the rake, substantially as set forth.

In testimony whereof I have hereunto set my hand in presence of two subscribing witnesses.

W. S. RICHARDS.

Witnesses:
F. N. ALLEN,
L. L. SWAN.